(12) United States Patent
Kaneko et al.

(10) Patent No.: US 6,297,864 B1
(45) Date of Patent: *Oct. 2, 2001

(54) LIQUID CRYSTAL DISPLAY

(75) Inventors: Yasushi Kaneko, Sayama; Masafumi Ide, Tokorozawa; Takashi Akiyama, Sayama, all of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/485,393

(22) PCT Filed: Feb. 9, 2000

(86) PCT No.: PCT/JP99/01027

§ 371 Date: Feb. 9, 2000

§ 102(e) Date: Feb. 9, 2000

(87) PCT Pub. No.: WO99/45426

PCT Pub. Date: Sep. 10, 1999

(30) Foreign Application Priority Data

Mar. 3, 1998 (JP) .................................................. 10-50356

(51) Int. Cl.[7] .................................................. G02F 1/1335
(52) U.S. Cl. .............................. 349/117; 345/119; 345/96; 345/176
(58) Field of Search .................................... 349/117, 119, 349/96, 176

(56) References Cited

U.S. PATENT DOCUMENTS 6,067,136 * 5/2000 Yamaguchi et al. .................... 349/96
6,169,708 * 1/2001 Kaneko et al. ......................... 368/84

FOREIGN PATENT DOCUMENTS

| | | |
|---|---|---|
| 197 08 066 A | 9/1998 | (DE) . |
| 0 606 939 A | 7/1994 | (EP) . |
| 0 862 076 A | 9/1998 | (EP) . |
| 0 884 621 A | 12/1998 | (EP) . |
| 52-5550 | 1/1977 | (JP) . |
| 57-141586 | 9/1982 | (JP) . |
| 6-230362 | 8/1994 | (JP) . |
| 6-230371 | 8/1994 | (JP) . |
| 7-36032 | 2/1995 | (JP) . |
| 9-258214 | 10/1997 | (JP) . |

OTHER PUBLICATIONS

"Reflective Polarizers with Display Compensation" IBM Technical Disclosure Bulletin, US, IBM Corp. New York, vol. 40, No. 3, Mar. 1, 1997.

* cited by examiner

Primary Examiner—Kenneth Parker
Assistant Examiner—Quynh-Nhu H. Vu
(74) Attorney, Agent, or Firm—Armstrong, Westerman, Hattori, McLeland & Naughton, LLP

(57) ABSTRACT

A single color liquid crystal display device is made up of a TN liquid crystal cell 7 with about 90° twisted nematic liquid crystals sealed in-between a pair of transparent substrates 1, 2 having respective transparent electrodes 3, 4, a first polarizing film 17 disposed on the visible side of the TN liquid crystal cell 7, and a second polarizing film 18, a retardation film 6 for circularly polarized light, a cholestric liquid crystal polymer sheet 10, a translucent light absorbing member 15 and a backlight 16 disposed successively on a side of the TN liquid crystal cell 7, opposite from the visible side thereof. With such a constitution, display is rendered visible even at night by lighting up the backlight 16, and colored display in a metallic tone can be indicated.

24 Claims, 7 Drawing Sheets

LIQUID CRYSTAL DISPLAY

TECHNICAL FIELD

The invention relates to a liquid crystal display device, and particularly, to a single color liquid crystal display device for coloring its background and display parts.

BACKGROUND TECHNOLOGY

As for the single color liquid crystal display device for coloring its background and display parts, several types have been proposed in the past.

A first type is a single color liquid crystal display device made up by providing a color polarizing film on the outer side of a liquid crystal cell thereof. This type has generally been in widespread use due to its simple constitution.

A second type is a single color liquid crystal display device wherein a dichroic pigment is mixed in nematic liquid crystals sealed in a liquid crystal cell thereof, and the dichroic pigment is caused to move together with the nematic liquid crystals by the action of nematic liquid crystal molecules, and this type is called a guest-host LCD.

However, with any of these conventional-type single-color liquid crystal display devices, colored characters and colored graphics produced by a dye or the dichroic pigment are displayed against a background in white, or white characters and white graphics are displayed against a background color produced by the dye or the dichroic pigment. Consequently, contrast declines. Furthermore, since the numbers of available dyes and dichroic pigments are limited, there is also a problem that the number of colors in which such liquid crystal display devices as described above can indicate display.

Accordingly, there has been proposed a third type of single color liquid crystal display device comprising a polarizing film, a 90° twisted nematic (TN) liquid crystal cell, a retardation film for circularly polarizing film (a quarter-wavelength plate, ¼λ plate), a cholesteric liquid crystal polymer sheet, and a light absorbing member.

Referring to FIG. 13, the display principle of the single color liquid crystal display device of this type is described hereinafter.

Shown in FIG. 13, the single color liquid crystal display device is made up of a polarizing film 8, a twist-aligned 90° TN liquid crystal cell which is not shown, a retardation film 9 for circularly polarized light, a cholesteric liquid crystal polymer sheet 10, and a light absorbing member 11.

In the left-hand part of the figure, an OFF-state indicating colored display is shown, wherein the polarizing film 8 and the retardation film 9 for circularly polarized light are disposed such that the transmission axis 8b of the polarizing film 8 is inclined 45° clockwise toward the phase delay axis 9a of the retardation film 9 for circularly polarized light. As a result, linearly polarized light transmitted through the polarizing film 8 is turned into right-handed circularly polarized light after passing through the retardation film 9 for circularly polarized light.

In the cholesteric liquid crystal polymer sheet 10, a twist direction 10a is right handed, and a twist pitch is close to a natural light wavelength, and accordingly, upon the right-handed circularly polarized light falling on the cholesteric liquid crystal polymer sheet 10, light components in a scattering band width Δλ around a scattering center wavelength λc are reflected due to the selective scattering phenomenon. Transmitted light composed of light components in wavelength regions, other than the scattering band width Δλ, is absorbed by the light absorbing member 11 made of a black paper or a black plastic sheet, whereupon a bright reflected color can be obtained.

If one defines n as the refractive index of a cholesteric liquid crystal polymer, and P as the twist pitch of the cholesteric liquid crystal polymer, the scattering center wavelength λc is given by the following formula:

$$\lambda c = n \times P$$

Hence, the cholesteric liquid crystal polymer sheet 10 having various reflected colors can be obtained by adjusting the twist pitch P of the cholesteric liquid crystal polymer.

Meanwhile, in the right-hand part of FIG. 13, an ON-state indicating black display is shown, wherein the polarizing film 8 and the retardation film 9 for circularly polarized light are disposed such that the transmission axis 8a of the polarizing film 8 is inclined 45° counterclockwise toward the phase delay axis 9a of the retardation film 9 for circularly polarized light by rotating the transmission axis 8a of the polarizing film 8 through 90°, so that linearly polarized light after passing through the retardation film 9 for circularly polarized light is turned into left-handed circularly polarized light.

Accordingly, even if the left-handed circularly polarized light falls on the cholesteric liquid crystal polymer sheet 10 having the twist direction 10a which is right handed, the selective scattering phenomenon does not occur. As a result, all components of the left-handed circularly polarized light are transmitted through the cholesteric liquid crystal polymer sheet 10, and absorbed by the light absorbing member 11, thus indicating black display.

If a 90° TN liquid crystal cell is installed between the polarizing film 8 and the retardation film 9 for circularly polarized light instead of rotating the transmission axis 8a of the polarizing film 8, this makes it possible to change by about 90° the polarization direction of linearly polarized light falling on the retardation film 9 for circularly polarized light depending on whether or not a voltage is applied to the TN liquid crystal cell, so that a background part in the OFF-state and display parts in the ON-state can be controlled optionally. Consequently, a single color liquid crystal display device having such a constitution is able to display black characters against a colored background in a bright metallic tone.

Such related art as described above has been disclosed in Japanese Patent Laid-Open No. S52-5550 and Japanese Patent Laid-Open No. H6-230362. There has also been disclosed in, for example, Japanese Patent Laid-Open No. H6-230371, a similar liquid crystal display device comprising a first polarizing film, a TN liquid crystal cell, a second polarizing film, a retardation film for circularly polarized light, a cholesteric liquid crystal polymer sheet, and a light absorbing member, wherein the second polarizing film is installed between the TN liquid crystal cell and the retardation film for circularly polarized light.

However, with these single color liquid crystal display devices using the cholesteric liquid crystal polymer sheet, illumination by backlighting is not feasible because of use of an opaque light absorbing member made of a black paper, a black plastic sheet, or so forth, thus causing a problem that display can not be shown in a dark environment such as at night, and so forth.

DISCLOSURE OF THE INVENTION

The invention has been developed to solve the problem described above, and it is therefore an object of the invention to provide a single color liquid crystal display device capable of rendering display visible even in a dark environment such as at night, and so forth, so that characters and graphics in a bright color can be displayed against a black background, or conversely, characters and graphics in a black color can be displayed in a colored background, using a backlight.

To this end, a liquid crystal display device according to the invention comprises a TN liquid crystal cell with about 90° twisted nematic liquid crystals sealed in-between a pair of transparent substrates having respective electrodes, a first polarizing film disposed on the visible side of the TN liquid crystal cell, and a second polarizing film, a retardation film for circularly polarized light, a cholestric liquid crystal polymer sheet, a translucent light absorbing member, and a backlight disposed successively on a side of the TN liquid crystal cell, opposite from the visible side thereof.

In place of the TN liquid crystal cell described above, an STN liquid crystal cell with 180° to 270° twisted nematic liquid crystals sandwiched between a pair of transparent substrates having respective electrodes may be installed, a retardation film may be disposed on the visible side of the STN liquid crystal cell, and a first polarizing film may be disposed on the outer side of the retardation film. Further, in place of the retardation film, a twist retardation film may be disposed.

Furthermore, instead of installing the translucent light absorbing member, a light emitting face of the backlight may be caused to have a function of scattering polarized light, and the backlight may be disposed opposite to the cholestric liquid crystal polymer sheet.

Otherwise, a liquid crystal display device according to the invention may comprise the TN liquid crystal cell, a first polarizing film disposed on the visible side of the TN liquid crystal cell, and a first retardation film for circularly polarized light, a cholestric liquid crystal polymer sheet, a second retardation film for circularly polarized light, a second polarizing film, a translucent light absorbing member, and a backlight disposed successively on a side of the TN liquid crystal cell, opposite from the visible side thereof.

In this case as well, instead of installing the translucent light absorbing member, a light emitting face of the backlight may be caused to have a function of scattering polarized light, and the backlight may be disposed opposite to the cholestric liquid crystal polymer sheet.

With any of the liquid crystal display devices described above, in place of the TN liquid crystal cell, the STN liquid crystal cell may be installed, a retardation film may be disposed on the visible side of the STN liquid crystal cell, and a first polarizing film may be disposed on the outer side of the retardation film. Further, in place of the retardation film, a twisted retardation film may be disposed.

Further, a luminescence center wavelength of the backlight is preferably deviated by not less than 50 nm from a selected scattering center wavelength of the cholestric liquid crystal polymer sheet.

More preferably, the backlight has not less than two luminescence center wavelengths, and at least one of the luminescence center wavelengths is deviated by not less than 50 nm from a selective scattering center wavelength of the cholestric liquid crystal polymer sheet.

Furthermore, a reflection-type polarizing film (a polarizing film reflecting the light linearly polarized in the direction orthogonal to the transmission axis thereof) may be disposed as the second polarizing film.

BEST MODE FOR CARRYING OUT THE INVENTION

A construction, operation and effect of a liquid crystal display device according to a preferred embodiment of the invention is now described in detail as follows with attached drawings.

Figure 1:
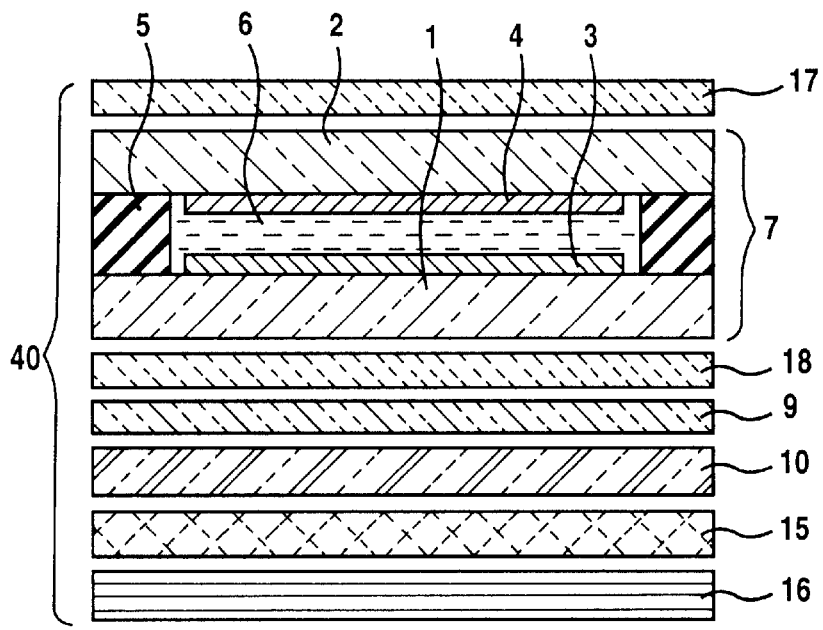
FIG. 1 is a schematic sectional view showing a constitution of a liquid crystal display device according to a first embodiment of the invention.
Figure 2:
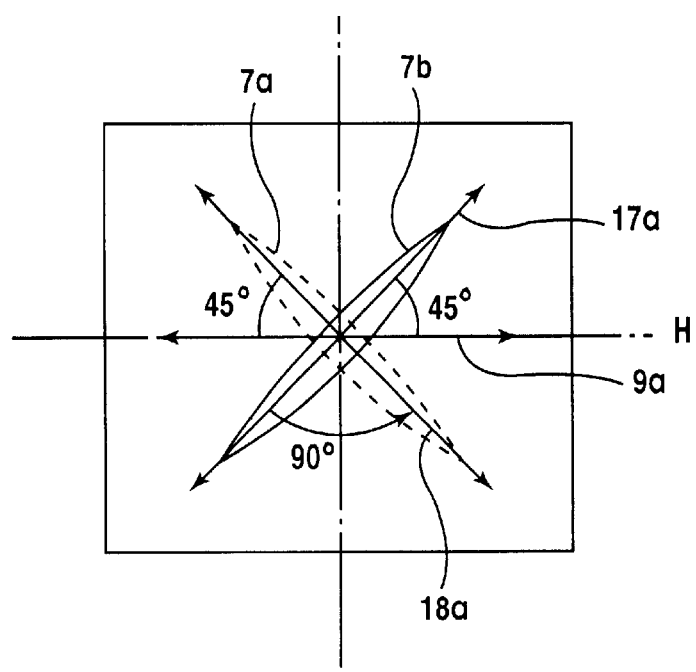
FIG. 2 is a schematic illustration showing relative positions of respective components of the liquid crystal display device according to the first embodiment of the invention.
Figure 11:
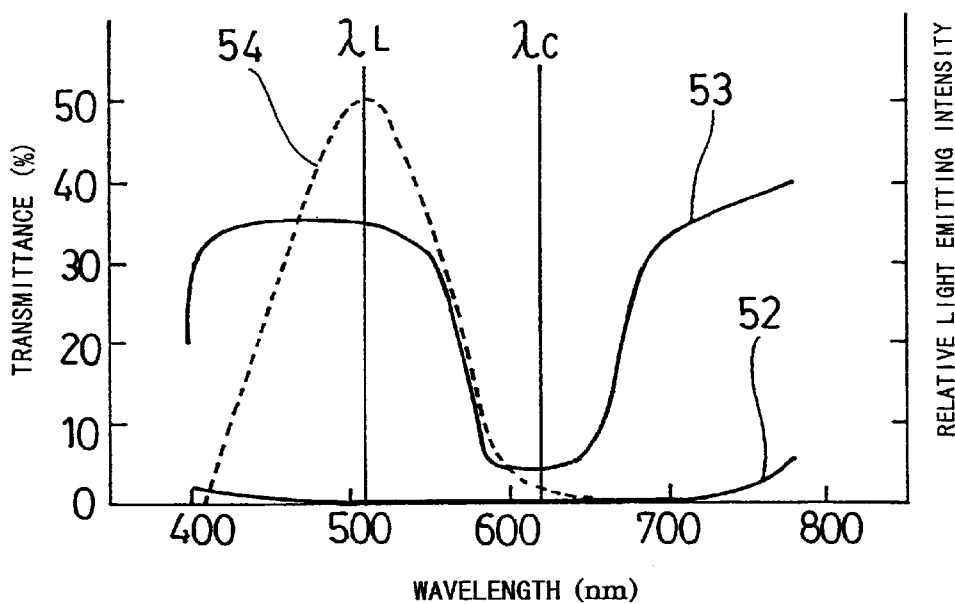
FIG. 11 is a diagrammatic view showing transmittance and emission spectrum of a backlight, of the liquid crystal display device according the first to sixth embodiments of the invention.

First Embodiment: FIG. 1, FIG. 2 and FIG. 11

A construction of a liquid crystal display device according to a first embodiment of the invention is now described with reference to FIGS. 1 and 2.

FIG. 1 is a schematic sectional view of the liquid crystal display device, and FIG. 2 is a view showing relative positions of respective elements thereof.

The liquid crystal display device according to the first embodiment comprises, shown in FIG. 1, a first transparent substrate 1 made of a glass plate having a thickness of 0.7 mm on which first transparent electrodes 3 made of indium tin oxide (hereinafter referred to as "ITO") are provided, a second transparent substrate 2 made of a glass plate having a thickness of 0.7 mm on which a second transparent electrodes 4 made of ITO are provided, and a sealant 5 for laminating the pair of substrates, wherein 90° twist-aligned nematic liquid crystals 6 are sealed in between the pair of transparent first and second substrates 1 and 2, thereby forming a TN liquid crystal cell 7.

A first polarizing film 17 is disposed on a visible side (a side where an observer sees, the upper side in FIG. 1) on the second substrate 2 of the TN liquid crystal cell 7, and a second polarizing film 18, a retardation film 9 for circularly polarized light, a cholesteric liquid crystal polymer sheet 10, a translucent light absorbing member 15 and a backlight 16 are disposed successively on a side opposite from the visible side, thereby constituting a liquid crystal display device 40.

The first substrate 1, the second polarizing film 18, the retardation film 9 for circularly polarized light and the cholesteric liquid crystal polymer sheet 10 are bonded to one another by an acrylic adhesive (not shown). Further, the first polarizing film 17 and the second substrate 2 are also bonded to each other by an acrylic adhesive (not shown).

Suppose the difference of birefringence Δn of the nematic liquid crystals 6 used in the TN liquid crystal cell is 0.15, and a cell gap d between the first substrate 1 and the second substrate 2 is 8000 nm. Accordingly, the Δnd value of the TN liquid crystal cell 7 which is a product of the difference of birefringence Δn of the nematic liquid crystals 6 and the cell gap d is 1200 nm. As the Δnd value decreases, the optical rotatory power lowers, and hence it is preferable that the Δnd value is not less than 500 nm.

An alignment layer (not shown) is formed, respectively, on an inner surface of the first transparent electrodes 3, and an inner surface of the second transparent electrodes 4. Accordingly, as shown in FIG. 2, an alignment direction 7a of lower liquid crystal molecules points 45° downward to the right when rubbing treatment in the direction of −45° on the basis of the horizontal axis H is applied to the first substrate 1, while an alignment direction 7b of upper liquid crystal molecules points 45° upward to the right when rubbing treatment in the direction of +45° on the basis of the horizontal axis H is applied to the second substrate 2, thereby forming the left-handed twist-aligned 90° TN liquid crystal cell 7.

The first polarizing film 17 is disposed such that the transmission axis 17a thereof points 45° upward to the right in the same manner as the alignment direction 7b of upper liquid crystal molecules of the TN liquid crystal cell 7, while second polarizing film 18 is disposed such that the transmission axis 18a thereof points 45° downward to the right in the same manner as the alignment direction 7a of lower liquid crystal molecules of the TN liquid crystal cell 7.

The retardation film 9 for circularly polarized light is prepared by spreading a polycarbonate resin to a thickness of about 60 μm, and the phase difference value is 140 nm, and a phase delay axis 9a thereof is oriented horizontally. The cholesteric liquid crystal polymer sheet 10 is disposed underneath the retardation film 9 for circularly polarized light, while a film prepared by dying polyethylene terephthalate (PET) having a thickness of 20 μm with a black dye so that the transmittance becomes 50% is installed as the translucent light absorbing member 15.

The cholesteric liquid crystal polymer sheet 10 is formed by applying alignment treatment to a base film which is a triacetylcellulose (TAC) film of 80 μm thickness, applying cholesteric liquid crystal polymer thereon, adjusting at a high temperature showing a liquid crystal phase so as to set the twist pitch to 380 nm and rotate clockwise with planer alignment in parallel with the base film, then cooling to not higher than the glass-transition temperature for solidification. Accordingly, the twist central axis is perpendicular to the base frame.

An electroluminescence plate (hereinafter referred to as "EL plate") having a thickness of 200 μm, and showing emitted light in a bluish green color used for the backlight 16. Even if the cholestric liquid crystal polymer sheet 10, the translucent light absorbing member 15 and the backlight 16 are disposed at whatever rotational angle within respective planes in parallel with each other, displaying characteristic will not be affected, and therefore, in FIG. 2, illustration of disposition directions is omitted.

Next, operation of displaying color of the liquid crystal display device according to the first embodiment of the invention is described hereinafter.

In the liquid crystal display device 40, the linearly polarized light which falls on the liquid crystal display device from the visible side and passed the first polarizing film 17 and is polarized in the direction of the transmission axis 17a in a state where no voltage is applied to the first transparent electrodes 3 and the second transparent electrodes 4 of the TN liquid crystal cell 7 falls on the TN liquid crystal cell 7 in the alignment direction 7b of upper liquid crystal molecules, and is rotated by 90° by the TN liquid crystal cell 7 and outgoes after it is turned into the linearly polarized light in the alignment direction 7a of lower liquid crystal molecules. Since the second polarizing film 18 is disposed such that the alignment direction 7a of lower liquid crystal molecules and the transmission axis 18a of the second polarizing film 18 are in parallel with each other, the linearly polarized light falling on the second polarizing film 18 passes the second polarizing film 18 as it is.

Figure 13:
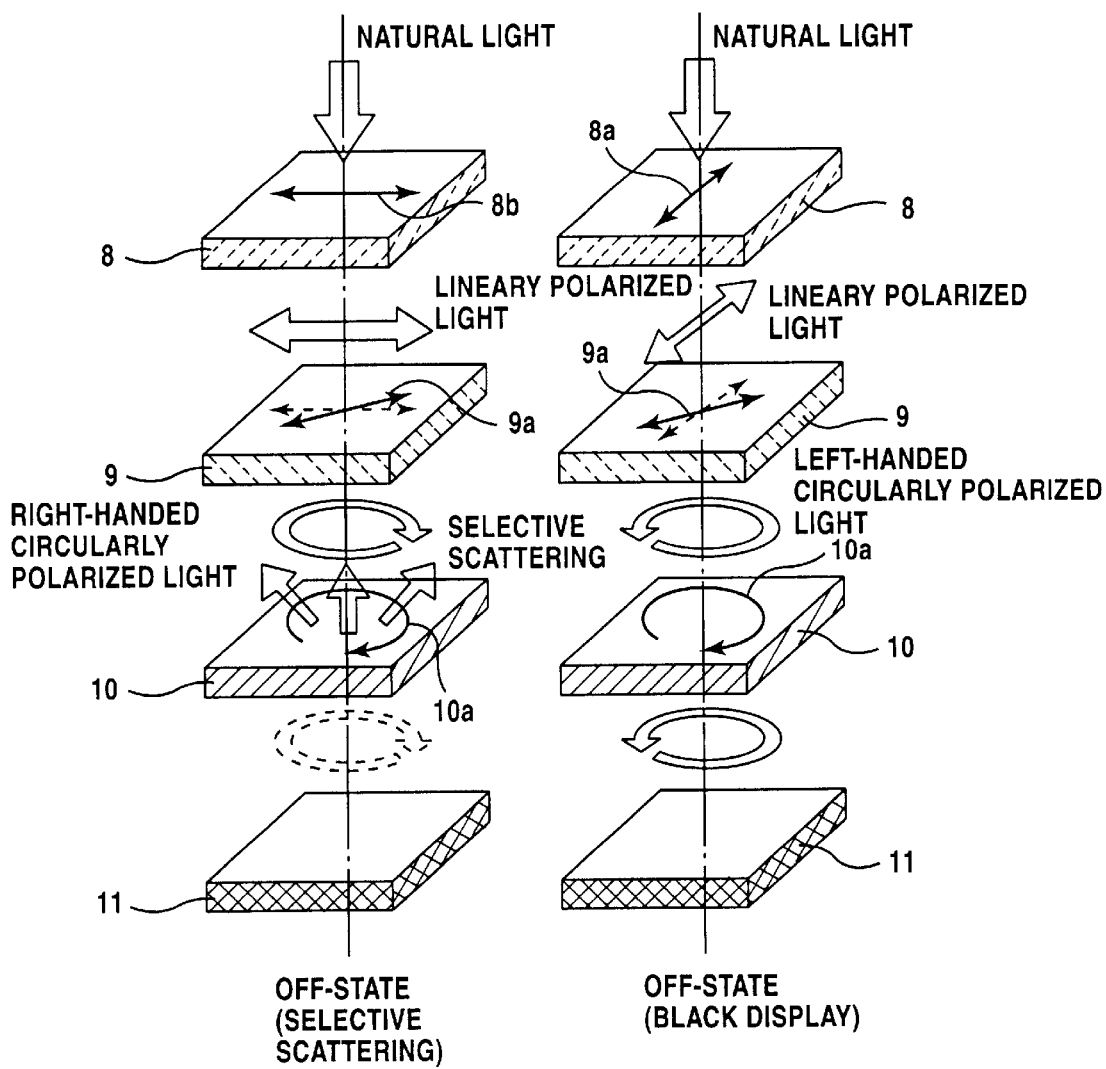
FIG. 13 is a schematic perspective view illustrating the display principle of a conventional single color liquid crystal display device using a cholestric liquid crystal polymer sheet.

Accordingly, the polarized light falls on the retardation film 9 for circularly polarized light while it is rotated clockwise by 45° from the phase delay axis 9a. Accordingly, it is turned into right-handed circularly polarized light in the same manner as the OFF-state shown in FIG. 13, which is the same as the twist direction 10a of the cholesteric liquid crystal polymer sheet 10. Accordingly, when the right-handed circularly polarized light falls on the cholesteric liquid crystal polymer sheet 10, light components in a scattering bandwidth Δλ around a scattering center wavelength λc are reflected due to the selective scattering phenomenon, and light components transmitted through wavelength regions, other than the scattering bandwidth Δλ, is absorbed by the translucent light absorbing film 15, whereupon a reflected color in a bright metallic tone can be obtained.

If one defines n as the refractive index of a cholestric liquid crystal polymer, and P as the twist pitch of the cholestric liquid crystal polymer, the scattering center wavelength λc is given by the following formula: λc=n×P Since right-twisted cholestric liquid crystal polymer having n as 1.65, P as 370 nm is employed in this embodiment, the scattering center wavelength λc becomes 610 nm, thereby obtaining a golden reflected color in a metallic tone.

Now, when a voltage is applied between the first transparent electrodes 3 of the TN liquid crystal cell 7 and the second transparent electrodes 4 of the same, molecules of the nematic liquid crystals 6 are caused to rise up, the light rotation property is extinguished. Then, linearly polarized light polarized in the alignment direction 7b of upper liquid crystal molecules falls on the TN liquid crystal cell 7, it passed as it is. Accordingly, the linearly polarized light falling on the second polarizing film 18 after passing the TN liquid crystal cell 7 is polarized in the direction intersecting the transmission axis 18a thereof at right angles, so that all components of light falling on the second polarizing film 18 are absorbed thereby, indicating black display.

In FIG. 11, the transmittance of the cholesteric liquid crystal polymer sheet 10 adopted in the first embodiment at the selective scattering state (no voltage is applied between the first transparent electrodes 3 and the second transparent electrodes 4) is shown by a solid curve 53, whereas the transmittance of the same when indicating black display (a voltage is applied between the first transparent electrodes 3 and the second transparent electrodes 4) is shown by a solid curve 52. At the selective scattering state, it is found from the curve 53 that right-handed circularly polarized light in the range from 560 nm to 670 nm around the scattering center wavelength of $\lambda c$=610 nm is reflected, but light out of the scattering bandwidth transmits as it is. Accordingly, if the transmitted light is restrained from returning to the visible side by absorbing that by the translucent light absorbing film 15, thereby a bright golden color can be performed by the reflected light due to the selective scattering phenomenon. When indicating a black display, as shown by the curve 52, light transmitted through the first polarizing film 17 are almost absorbed by the second polarizing film 18, thereby indicating a black display.

Next, operation of the backlight 16 in FIG. 1 is described hereinafter. A dotted line curve 54 in FIG. 11 is a spectrum showing relative light emitting density of the EL plate showing emitted light in a bluish green color used for the backlight 16 of the liquid crystal display device 40, which indicates emitted light in a bluish green color in a luminescence center wavelength $\lambda L$=510 nm.

With the liquid crystal display device 40, light does not transmit in an ON-state indicating a black display when a voltage is applied as shown in the curve 52, so that it remains dark even if the backlight 16 is lit up. However, golden reflected color is indicated in a state where no voltage is applied, and light having not more than 560 nm can transmit as shown in the curve 53.

Light emitted by the backlight 16 having luminescence center wavelength $\lambda L$=510 nm that is smaller than the selective scattering center wavelength $\lambda c$=610 nm of the cholesteric liquid crystal polymer sheet 10 by 100 nm substantially completely transmits through the cholesteric liquid crystal polymer sheet 10, thereby illuminating brightly, so that an excellent visibility can be obtained even at night.

If the translucent light absorbing member 15 and the backlight 16 are provided without installing the second polarizing film 18 in FIG. 1, the liquid crystal display device capable of indicating single color in a metallic tone can be obtained. In this case, the operation of displaying color is the same as that in the first embodiment in the case of OFF-state indicating a golden display, but in the case of ON-state indicating a black display light outgoing from the retardation film 9 for circularly polarized light is turned into left-handed state of circularly polarized light, and it transmits through the right-twisted cholesteric liquid crystal polymer sheet 10 so that it is absorbed by the translucent light absorbing member 15 to indicate a black color.

If the backlight 16 is lit up in this state, light transmitted through the translucent light absorbing member 15 illuminates bright because the transmittance in the black display part in the ON-state is high, while light illuminates dark because the transmittance in golden part in the OFF-state is low, thereby indicating an inversion display in monochrome relation contrary to the reflected state using an external light. In this case, the difference in an amount of transmittance of a backlight between ON-state and OFF-state is small, thereby lowering a contrast.

Further, if the backlight 16 of the liquid crystal display device 40 is lit up in a dim environment, the golden portion in the OFF display reflects the external light and illuminates, while the black portion in the ON state transmits the backlight therethrough and illuminates, so that the contrast between the characters and a background scarcely presents, thereby markedly lowering the visibility.

However, with the liquid crystal display device 40, it is the same display in a monochrome relation viewing in a reflected state using an external light and viewing in a transmittance state using a backlight, thereby improving the visibility when lighting up the backlight in a dim environment.

With the construction comprising the first polarizing film 17, the TN liquid crystal cell 7, the second polarizing film 18, the retardation film 9 for circularly polarized light, the cholesteric liquid crystal polymer sheet 10, the translucent light absorbing member 15 and the backlight 16, a display of bright reflected color with high contrast is obtained, and also it becomes a correct conversion even by illumination by backlighting, thereby obtaining the liquid crystal display device capable of indicating a single colored display in a metallic tone and of enhancing visibility even at night.

Modification of First Embodiment

In the foregoing first embodiment, the selective scattering center wavelength $\lambda c$ of the cholesteric liquid crystal polymer sheet 10 and the luminescence center wavelength $\lambda L$ of the backlight are deviated by 100 nm, but if they are deviated by 50 nm, the brightness of illumination of the backlight is somewhat lowered, which however does not cause any problem.

Although the cholesteric liquid crystal polymer having a pitch P=370 nm is used as the cholesteric liquid crystal polymer sheet 10 to form the liquid crystal display device indicating golden and black displays in the first embodiment, it is possible to change a color tone in a reflecting state by optionally changing a pitch P of the cholesteric liquid crystal polymer. For example, it is possible to obtain a liquid crystal display device indicating blue and black displays supposing that P=300 nm ($\lambda c$=490 nm). In this case, an EL plate having a luminescence center wavelength $\lambda L$ of 560 nm, and showing emitted light in an orange color is employed.

Although the an EL plate showing emitted light in a bluish green color is employed as the backlight 16 in the first embodiment, even if a side light consisting of a light emitting diode (LED) showing emitted light in a green color which is attached to a plastic light guide plate is employed, the bright illumination which is the same as the foregoing can be obtained.

Further, although the first embodiment indicates a colored display in a state where no voltage is applied and a black display in a state where a voltage is applied, if the transmission axis 17a of the first polarizing film 17 is rotated by 90° to be oriented in the same direction as the alignment direction 7a of lower liquid crystal molecule, it is possible to indicate a black display in a state where no voltage is applied and indicate a colored display in a state where a voltage is applied.

Alternatively, even if the transmission axis 18a of the second polarizing film 18 is rotated by 90°, it is possible to indicate a black display in a state where no voltage is applied and a colored display in a state where a voltage is applied.

Although the retardation film 9 for circularly polarized light is disposed between the second polarizing film 18 and the cholesteric liquid crystal polymer sheet 10 in the first embodiment, the retardation film 9 for circularly polarized light can be removed although the reflecting efficiency of the cholesteric liquid crystal polymer sheet 10 is somewhat lowered, and a metallic color becomes somewhat dark.

Figure 3:
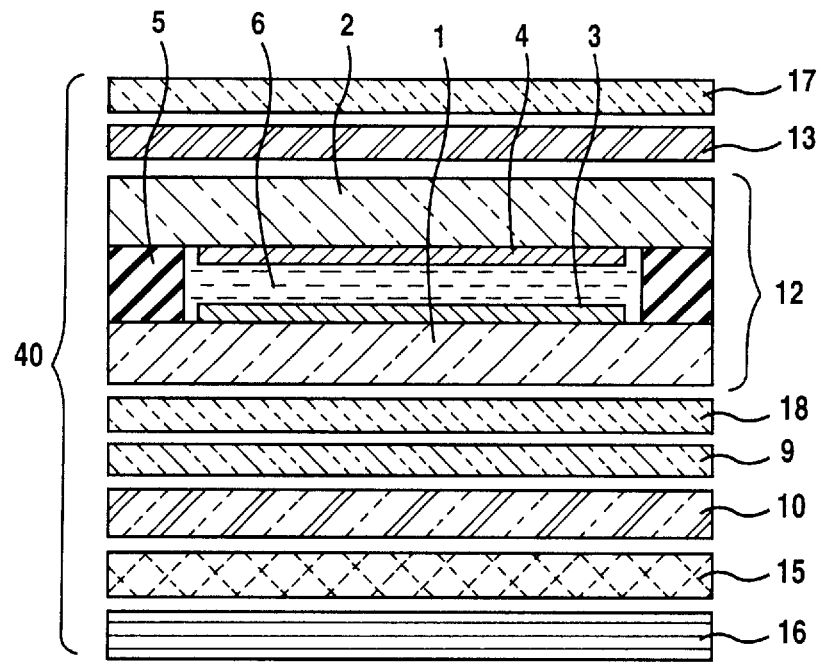
FIG. 3 is a schematic sectional view showing a constitution of a liquid crystal display device according to a second embodiment of the invention.
Figure 4:
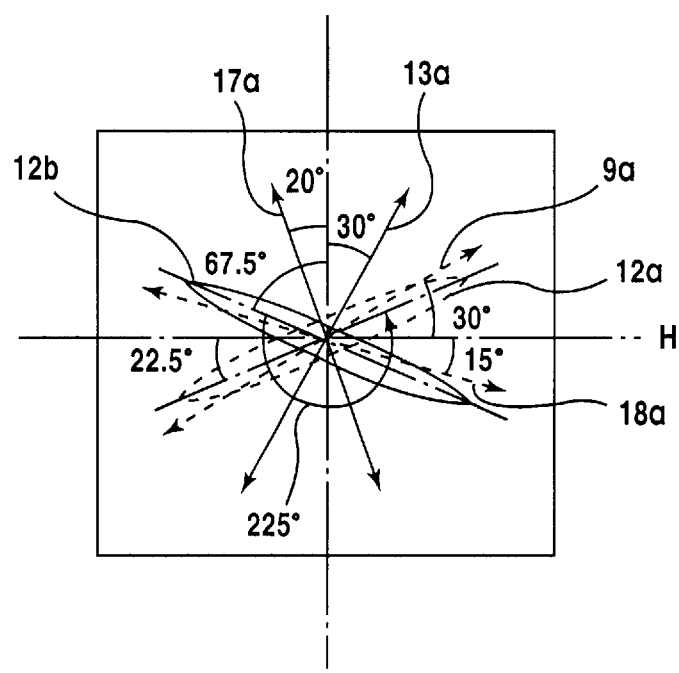
FIG. 4 is a schematic illustration showing relative positions of respective components of the liquid crystal display device according to the second embodiment of the invention.

Second Embodiment: FIGS. 3 and 4

A liquid crystal display device according to a second embodiment of the invention is now described with reference to FIGS. 3 and 4.

The liquid crystal display device of this embodiment is the same as the first embodiment in construction except that 225° twist-aligned STN liquid crystal cell as the liquid crystal cell, and that a retardation film are used.

FIGS. 3 and 4 are views for explaining the construction of the liquid crystal display device of the second embodiment which are the same as FIGS. 1 and 2, wherein the components which correspond to those in FIGS. 1 and 2 are denoted by the same reference numerals and the explanation thereof is omitted.

The liquid crystal display device 40 according to the second embodiment comprises a first transparent substrate 1 made of a glass plate having a thickness of 0.7 mm on which a first transparent electrodes 3 made of ITO are provided, a second transparent substrate 2 made of a glass plate having a thickness of 0.7 mm on which second transparent electrodes 4 made of ITO are provided, and a sealant 5 for laminating the pair of substrates 1 and 2 wherein 225° twist-aligned nematic liquid crystals 6 are sealed in between the pair of transparent first and second substrates 1 and 2, thereby forming a STN liquid crystal cell 12.

A retardation film 13 and a first polarizing film 17 are disposed successively outside the second substrate 2 at a visible side of the STN liquid crystal cell 12, and a second polarizing film 18, a retardation film 9 for circularly polarized light, a cholesteric liquid crystal polymer sheet 10, a translucent light absorbing member 15 and a backlight 16 are disposed successively on a side opposite from the visible side, thereby constituting a liquid crystal display device 40.

The first polarizing film 17, the second polarizing film 18, the cholesteric liquid crystal polymer sheet 10, the retardation film 9 for circularly polarized light, the translucent light absorbing member 15 and the backlight 16 are the same as those employed in the first embodiment.

A first substrate 1, the second polarizing film 18, the retardation film 9 for circularly polarized light and the cholesteric liquid crystal polymer sheet 10 are respectively bonded using an acrylic adhesive (not shown). Further, the first polarizing film 17, the retardation film 13 and a second substrate 2 are also bonded using an acrylic adhesive (not shown).

Suppose the difference of birefringence Δn of the nematic liquid crystals 6 to be used is 0.15 and a cell gap d between the first substrate 1 and the second substrate 2 is 5400 nm. Accordingly, the Δnd value of the liquid crystal cell which is a product of the difference of the birefringence Δn of the nematic liquid crystals 6 and the cell gap d is 810 nm. Further, a twist pitch of the nematic liquid crystals 6 is adjusted to 1100 nm.

An alignment layer (not shown) is formed, respectively, on an inner surface of the first transparent electrodes 3, and an inner surface of the second transparent electrodes 4, and shown in FIG. 4, an alignment direction 12a of lower liquid crystal molecules points 22.5° upward to the right when rubbing treatment in the direction of +22.5° on the basis of the horizontal axis H is applied to the first substrate 1, while an alignment direction 12b of upper liquid crystal molecules points 22.5° downward to the right when rubbing treatment in the direction of −22.5° on the basis of the horizontal axis H is applied to the second substrate 2, thereby forming the left-handed 225° twist-aligned STN liquid crystal cell 12.

The first polarizing film 17 is disposed such that the transmission axis 17a thereof is oriented in the direction of −70° on the basis of the horizontal axis H, and the retardation film 13 made of polycarbonate resin and having the thickness of 50 µm and phase difference value of 550 nm is disposed between the STN liquid crystal cell 12 and the first polarizing film 17 such that a phase delay axis 13a thereof is oriented in the direction of 60° on the basis of the horizontal axis H.

The second polarizing film 18 is disposed underneath the STN liquid crystal cell 12 such that the transmission axis 18a thereof is oriented in the direction of −15° on the basis of the horizontal axis H, and the retardation film 9 for circularity polarized light is disposed such that the phase delay axis 9a thereof is oriented in the direction of 30° on the basis of the horizontal axis H so that the phase delay axis 9a forms an angle of 45° with the transmission axis 18a of the second polarizing film 18.

To improve viewing angles characteristic, the retardation film 13 uses a biaxial retardation film satisfying the relation of nx>nz>ny supposing that nx is the refractive index in the phase delay direction, ny is refractive index in the direction of Y axis and nz is the refractive index in the thickness direction. It is needless to say that the use of an uniaxial retardation film causes no problem.

Even if the cholestric liquid crystal polymer sheet 10, the translucent light absorbing member 15 and the backlight 16 are disposed at whatever rotational angle within respective planes in parallel with each other, displaying characteristic will not be affected, and therefore, in FIG. 4, illustration of disposition directions is omitted.

Next, operation of displaying color of the liquid crystal display device 40 according to the second embodiment of the invention is described hereinafter. With the liquid crystal display device 40, in a state where no voltage is applied to the STN liquid crystal cell 12, linearly polarized light falling thereon from the visible side thereof (upper side in FIG. 3) through the first polarizing film 17 and polarized in the direction of the transmission axis 17a of the first polarizing film 17, is turned into a state of elliptic polarized light after transmitted through the STN liquid crystal cell 12 in the case where the retardation film 13 is not installed, so that circularly polarized light can not be produced even after passing through the retardation film 9 for circularly polarized light, thereby indicating insufficient display.

However, since the retardation film 13 is installed between the first polarizing film 17 and the STN liquid crystal cell 12, the linearly polarized light falling on the retardation film 13 through the first polarizing film 17 is turned into a state of elliptic polarized light. The elliptic polarized light is corrected during passage through the STN liquid crystal cell 12, is turned into the substantially linearly polarized light, then it is turned into the linearly polarized light which is at about a 55° counterclockwise angle with respect to the transmission axis 17a of the first polarizing film 17, and outgoes.

Since the second polarizing film 18 is disposed such that the transmission axis 18a of the second polarizing film 18 is oriented in the direction at −15° on the basis of the horizontal axis H, the linearly polarized light falling thereon from the first polarizing film 17 is transmitted through the second polarizing film 18 as it is. Since the retardation film 9 for circularly polarized light is disposed such that the phase delay axis 9a thereof is oriented in the direction of +45° with respect to the transmission axis 18a of the second polarizing film, and linearly polarized light at a 45° clockwise angle with respect to the phase delay axis 9a of the retardation film 9 for circularly polarized light falls thereon, it is turned into right-handed circularly polarized light.

As with the case of the first embodiment, the cholestric liquid crystal polymer sheet 10 which is right-handed is employed, consequently, light component in a scattering bandwidth Δλ around a scattering center wavelength birefringence λc are reflected due to the selective scattering phenomenon, and light components transmitted through wavelength regions, other than the scattering bandwidth Δλ., is absorbed by the translucent light absorbing member 15, whereupon a golden reflected color in a bright metallic tone can be obtained.

Now, when a voltage is applied between the first transparent electrodes 3 of the STN liquid crystal cell 12 and the second transparent electrodes 4 of the same, molecules of the nematic liquid crystals 6 are caused to rise up, and birefringency of the STN liquid crystal cell 12 undergoes a change, so that polarization of linearly polarized light outgoing is rotated by about 90° to be in the direction at +75° on the basis of the horizontal axis H shown in FIG. 4. Accordingly, polarizing direction of the linearly polarized light transmitted through the STN liquid crystal cell 12 is deviated by 90° from the transmission axis 18a of the second polarizing film 18, so that all components of light falling on the second polarizing film 18 are absorbed thereby, indicating black display. Accordingly, it is possible to indicate a black display with high contrast by the use of the second polarizing film 18.

As with the case of the first embodiment, an EL plate having a luminescent center wavelength λL=510 nm, and showing emitted light in a bluish green color is used for the backlight 16. In a black display state where a voltage is applied, light is not transmitted through the liquid crystal display device, however, in a sate where no voltage is applied and display in a golden reflected color is indicated, light components having wavelengths not more than 560 nm can be transmitted therethrough.

Accordingly, light emitted by the backlight 16 having luminescence center wavelength λL that is smaller than the selected scattering center wavelength λc=610 nm of the cholesteric liquid crystal polymer sheet 10 by 100 nm substantially completely transmits, thereby illuminating brightly. Further, so it indicates the same display in brightness relation as the display by an external light without backlighting, enhance visibility can be performed even at night.

With the construction comprising the first polarizing film 17, the retardation film 13, the STN liquid crystal cell 12, the second polarizing film 18, the retardation film 9 for circularly polarized light, the cholesteric liquid crystal polymer sheet 10, the translucent light absorbing member 15, and the backlight 16, a display of bright reflected color with high contrast is obtained, and it also becomes a correct conversion even by illumination by backlighting, thereby obtaining the liquid crystal display device capable of indicating a single colored display in a metallic tone and of enhancing visibility even at night.

Modification of Second Embodiment

Although the 225° twist-aligned STN liquid crystal cell was employed as the STN liquid crystal cell 12 in the second embodiment, the liquid crystal display device which is the same as that in the second embodiment can be obtained even if a 180° to 270° twist-aligned STN liquid crystal cell is employed.

Although one piece of retardation film 13 is employed for returning the state of elliptical polarized light of the STN liquid crystal cell 12 to the linearly polarized light in the second embodiment, if plural pieces of retardation films are employed, the state of elliptical polarized light can be returned to a more complete linearly polarized light, thereby indicating a more excellent black display and a colored display. The plural pieces of retardation films may be installed on one side of the STN liquid crystal cell 12, or they may be divided and installed on both sides of the STN liquid crystal cell 12.

Further, although the retardation film 9 for circularly polarized light is installed between the second polarizing film 18 and the cholesteric liquid crystal polymer sheet 10 in the second embodiment, even if the retardation film 9 for circularly polarized light is omitted, the liquid crystal display device can be practicably used, though the reflecting efficiency of the cholesteric liquid crystal polymer sheet 10 is somewhat lowered and metallic color becomes somewhat dark.

Figure 5:
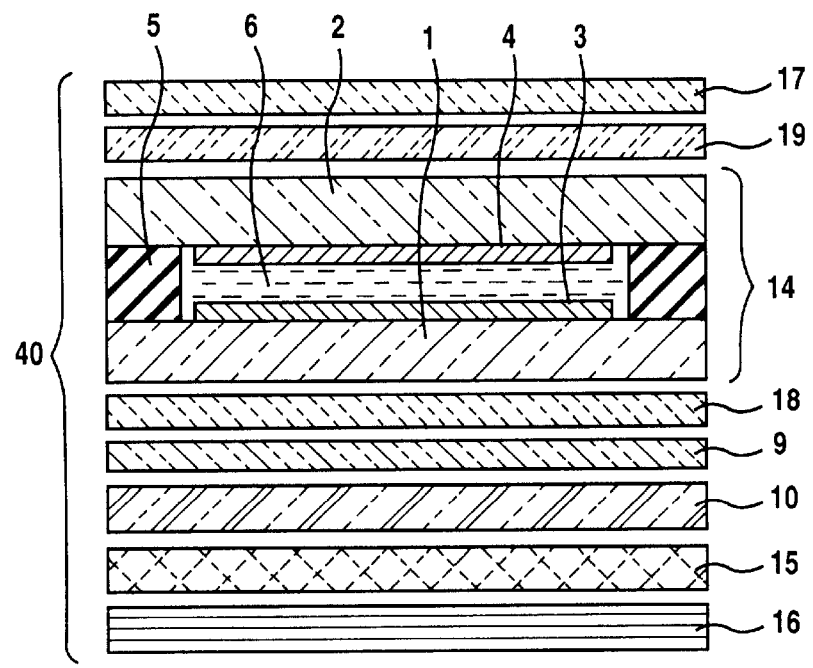
FIG. 5 is a schematic sectional view showing a constitution of a liquid crystal display device according to a third embodiment of the invention.
Figure 6:
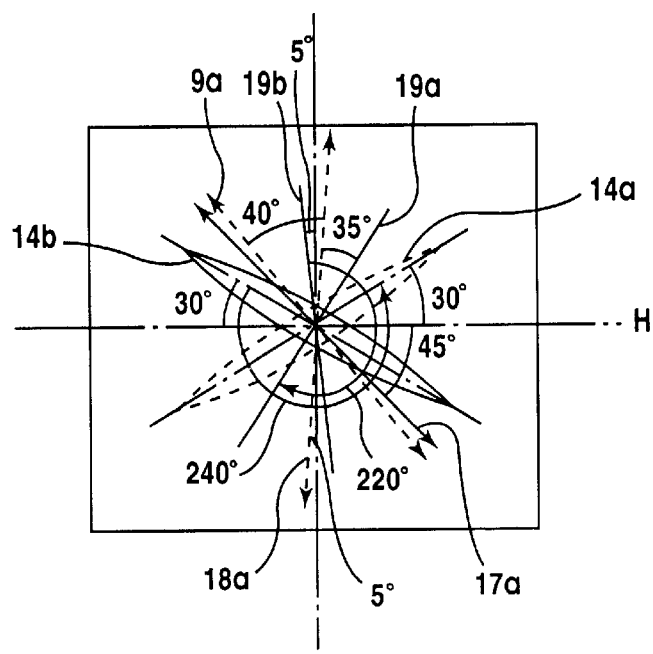
FIG. 6 is a schematic illustration showing relative positions of respective components of the liquid crystal display device according to the third embodiment of the invention.

Third Embodiment: FIGS. 5 and 6

A liquid crystal display device according to a third embodiment of the invention is now described with reference to FIGS. 5 and 6.

Since the liquid crystal display device of this embodiment is the same as the first embodiment in construction except that 240° twist-aligned STN liquid crystal cell as the liquid crystal cell is used, and that a twisted retardation film is installed.

FIGS. 5 and 6 are views for explaining the construction of the liquid crystal display device of the third embodiment which are the same as FIGS. 1 and 2, wherein the components which correspond to those in FIGS. 1 and 2 are denoted by the same reference numerals and the explanation thereof is omitted.

The liquid crystal display device 40 according to the third embodiment comprises a first transparent substrate 1 made of a glass plate having a thickness of 0.7 mm on which first transparent electrodes 3 made of ITO are provided, a second transparent substrate 2 made of a glass plate having a thickness of 0.7 mm on which second transparent electrodes 4 made of ITO are provided, and a sealant 5 for laminating the pair of substrates 1 and 2 wherein 240° twist-aligned nematic liquid crystals 6 are sealed in between the pair of transparent first and second substrates 1 and 2, thereby forming a STN liquid crystal cell 14.

A twisted retardation film 19 and a first polarizing film 17 are installed successively outside the second substrate 2 at a visible side of the STN liquid crystal cell 14, and a second polarizing film 18, a retardation film 9 for circularly polarized light, a cholesteric liquid crystal polymer sheet 10, a translucent light absorbing member 15 and a backlight 16 are disposed successively on a side opposite from the visible side, thereby constituting a liquid crystal display device 40.

The first polarizing film 17, the second polarizing film 18, the cholesteric liquid crystal polymer sheet 10, and the retardation film 9 for circularly polarized light, the translucent light absorbing member 15 and the backlight 16 are the same as those employed in the first embodiment.

A first substrate 1, the second polarizing film 18, the retardation film 9 for circularly polarized light and the cholesteric liquid crystal polymer sheet 10 are respectively bonded using an acrylic adhesive (not shown). Further, the first polarizing film 17, the twisted retardation film 19 and a second substrate 2 are also bonded using an acrylic adhesive (not shown).

Suppose the difference Δn of birefringence of the nematic liquid crystals 6 used in the STN liquid crystal cell 14 is 0.15, and a cell gap d between the first substrate 1 and the second substrate 2 is 5600 nm. Accordingly, the Δnd value of the liquid crystal cell which is a product of the difference of birefringence Δn of the nematic liquid crystals 6 and the cell gap d is 840 nm. Further, the twist pitch of the nematic liquid crystals 6 is adjusted to 1100 nm.

An alignment layer (not shown) is formed, respectively, on an inner surface of the first transparent electrodes 3, and an inner surface of the second transparent electrodes 4, facing each other, and shown in FIG. 6, an alignment direction 14a of lower liquid crystal molecules points 30° upward to the right when rubbing treatment in the direction of +30° on the basis of the horizontal axis H is applied to the first substrate 1, while an alignment direction 14b of upper liquid crystal molecules points 30° downward to the right when rubbing treatment in the direction of −30° on the basis of the horizontal axis H is applied to the second substrate 2, thereby forming the left-handed 240° STN liquid crystal cell 14.

The first polarizing film 17 is disposed such that the transmission axis 17a thereof is oriented in the direction of −45° on the basis of the horizontal axis H and the twisted retardation film 19 having Δnd value of 610 nm and 220° twisted clockwise is disposed between the STN liquid crystal cell 14 and the first polarizing film 17 so as to be oriented in the direction of +55° on the basis of the horizontal axis H such that a lower molecule axis 19a thereof intersects the alignment direction 14b of the upper liquid crystal molecules substantially at right angles. Accordingly, an upper molecule axis 19b of the twisted retardation film 19 comes to be oriented in the direction of −85°.

The second polarizing film 18 is disposed underneath the first substrate 1 such that the transmission axis 18a thereof is oriented in the direction of +85° on the basis of the horizontal axis H, and the retardation film 9 for circularity polarized light is disposed such that the phase delay axis 9a thereof is oriented in the direction of −50° on the basis of the horizontal axis H so that the phase delay axis 9a forms an angle of 45° with the transmission axis 18a of the second polarizing film 18.

The twisted retardation film 19 is formed by applying alignment treatment to a base film which is a triacetylcellulose (TAC) film of 80 μm thickness, applying liquid crystal polymer thereon, adjusting thickness and twist pitch thereof at a high temperature showing a liquid crystal phase so as to have a twist angle of 220°, then cooling to not higher than the glass-transition temperature for solidification.

Even if the cholesteric liquid crystal polymer sheet 10, the translucent light absorbing member 15, and the backlight 16 are disposed at whatever rotational angle within respective planes in parallel with each other, displaying characteristic will not be affected, and therefore, in FIG. 6, illustration of disposition directions is omitted.

Next, operation of displaying color with the third embodiment of the liquid crystal display device according to the invention is described hereinafter.

With the liquid crystal display device 40, in a state where no voltage is applied to the STN liquid crystal cell 14, linearly polarized light falling thereon from the visible side thereof through the first polarizing film 17 is polarized in the direction of the transmission axis 17a of the first polarizing film 17, and is turned into a state of elliptic polarized light after transmitted through the STN liquid crystal cell 14 in the case where the twisted retardation film 19 is not installed, so that circularly polarized light can not produced even after passing through the retardation film 9 for circularly polarized light, thereby indicating insufficient display.

However, since the twisted retardation film 19 is installed between the first polarizing film 17 and the STN liquid crystal cell 14, the linearly polarized light falling on the twist retardation film 19 from the first polarizing film 17 is turned into a state of elliptic polarized light. The elliptic polarized light is corrected during passage through the STN liquid crystal cell 14, is turned into substantially linearly polarized light, and is rotated clockwise by about 50° with respect to the transmission axis 17a of the first polarizing film 17, and outgoes in the direction of polarization at 85° on the basis of the horizontal axis H shown in FIG. 6.

Since the second polarizing film 18 is disposed such that the transmission axis 18a thereof is oriented in the direction at 85° on the basis of the horizontal axis H, the linearly polarized light falling thereon from the first polarizing film 17 is transmitted through the second polarizing film 18 as it is. Since the retardation film 9 for circularly polarized light is disposed such that the phase delay axis 9a thereof is oriented in the direction of +45° with respect to the second polarizing film 18, linearly polarized light at a 45° clockwise angle with respect to phase delay axis of the retardation film 9 for circularly polarized light falls thereon, and is turned into right-handed circularly polarized light.

As with the case of the first embodiment, the cholestric liquid crystal polymer sheet 10 which is right handed is absorbed, consequently, light components in a scattering bandwidth Δλ around a scattering center wavelength λc are reflected due to the selective scattering phenomenon, and light components transmitted through wavelength regions other than the scattering bandwidth Δλ, is absorbed by the translucent light absorbing member 15, whereupon a golden reflected color in a bright metallic tone can be obtained.

Now, when a voltage is applied between the first transparent electrodes 3 of the STN liquid crystal cell 14 and the second transparent electrodes 4 of the same, molecules of the nematic liquid crystals 6 are caused to rise up, and birefringency of the STN liquid crystal cell 14 undergoes a change, so that polarization direction of linearly polarized light outgoing is rotated by about 90° so as to be in the direction at −5° on the basis of the horizontal axis H. Accordingly, the linearly polarized light transmitted through the STN liquid crystal cell 14 is deviated by 90° from the transmission axis 18a of the second polarizing film 18, so that all components of light falling on the second polarizing film 18 are absorbed thereby, indicating black display.

Further, as a result of using the twisted retardation film 19 in place of the retardation film 13 used in the second embodiment, elliptic polarized light can be fully corrected, and linear polarization characteristics of light transmitted through the STN liquid crystal cell 14 is enhanced, so that display that is brighter and higher contrast than that in the case of the liquid crystal display device using the retardation film 13 can be obtained.

As with the case of the first embodiment, an EL plate having a luminescent center wavelength λL=510 nm, and showing emitted light in a bluish green color used for the backlight. In a black display state where a voltage is applied, light is not transmitted through the liquid crystal display device 40, however, in a sate where no voltage is applied and display in a golden reflected color is indicated, light components having wavelengths not more than 560 nm can be transmitted therethrough.

Accordingly, light emitted by the backlight 16 having luminescence center wavelength λL that is smaller than the selected scattering center wavelength λc=610 nm of the cholesteric liquid crystal polymer sheet 10 by 100 nm completely transmits, thereby illuminating brightly. Further, it becomes a correct conversion which is the same as the display by an external light when the backlight 16 is not lit up, so that an excellent visibility can be obtained even at night.

With the construction comprising the first polarizing film 17, the twisted retardation film 19, the second polarizing film 18, the retardation film 9 for circularly polarized light, the cholesteric liquid crystal polymer sheet 10, the translucent light absorbing member 15, and the backlight 16, it is possible to obtain a liquid crystal display device capable of indicating a bright reflected colored display with high contrast, and the display by illumination of backlight is not inverted, thereby indicating a single colored display in a metallic tone with high visibility even at night.

Modification of Third Embodiment

Although the 240° twist-aligned STN liquid crystal cell was employed as the STN liquid crystal cell 14 in the third embodiment, the liquid crystal display device which is the same as that in the third embodiment can be obtained even if a 180° to 270° twist-aligned STN liquid crystal cell is employed.

Further, although the retardation film 9 for circularly polarized light is installed between the second polarizing film 18 and the cholesteric liquid crystal polymer sheet 10 in the third embodiment, even if the retardation film 9 for circularly polarized light is omitted, the liquid crystal display device is feasible while the reflecting efficiency of the cholesteric liquid crystal polymer sheet 10 is somewhat lowered and metallic color becomes somewhat dark.

Figure 7:
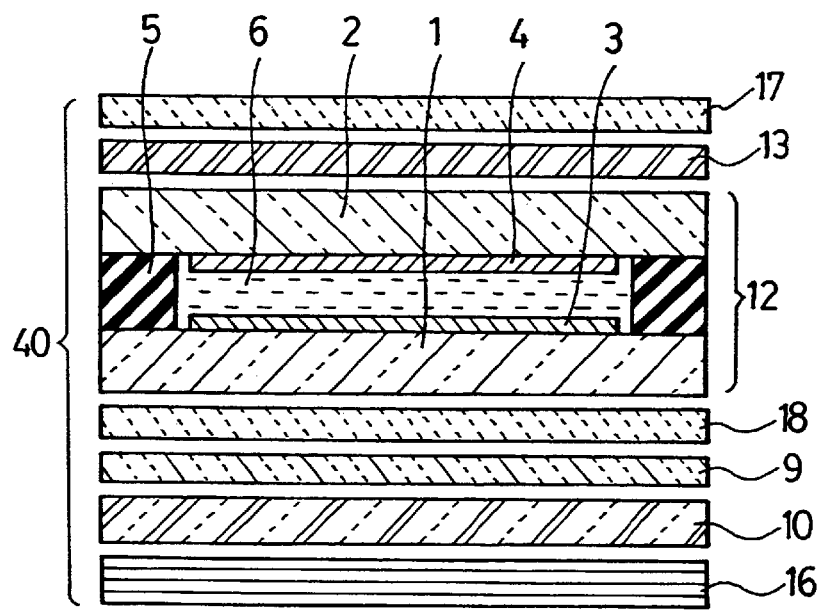
FIG. 7 is a schematic sectional view showing a constitution of a liquid crystal display device according to a fourth embodiment of the invention.

Fourth Embodiment: FIG. 7

A liquid crystal display device according to a fourth embodiment of the invention is now described with reference to FIG. 7.

Since the liquid crystal display device of this embodiment is the same as the second embodiment in construction except that the translucent light absorbing member 15 is removed, the different point alone is described hereinafter.

A liquid crystal display device 40 in the fourth embodiment comprises an STN liquid crystal cell 12 with about 225° twisted nematic liquid crystals 6 sealed therein, a retardation film 13 and a first polarizing film 17 disposed successively on a visible side (upper side in FIG. 7), and a second polarizing film 18, a retardation film 9 for circularly polarized light, a cholesteric liquid crystal polymer sheet 10 and a backlight 16 disposed successively on a side opposite from the visible side (lower side in FIG. 7).

The backlight 16 has a function of scattering polarized light at its light emitting surface, namely, a surface opposite to the cholesteric liquid crystal polymer sheet 10.

The operation for displaying colors by the liquid crystal display device 40 in the fourth embodiment is described next. In a state where no voltage is applied to the STN liquid crystal cell 12 in the liquid crystal display device 40, a linearly polarized light which falls on the retardation film 13 from the visible side through the first polarizing film 17 is turned in a state of an elliptic polarized light when it passes through the retardation film 13. The elliptic polarized light is corrected during passage through the STN liquid crystal cell 12, is turned into substantially linearly polarized light, and outgoes having a polarizing direction rotated counterclockwise by about 55° with respect to the transmission axis 17a of the first polarizing film 17 shown in FIG. 4.

Since the second polarizing film 18 is disposed so that a transmission axis 18a of the second polarizing film 18 is oriented in the direction of −15° on the basis of a horizontal axis H, the linearly polarized light falling thereon from the first polarizing film 17 passes the second polarizing film 18 as it is.

Since the retardation film 9 for circularly polarized light is disposed at the angle of +45° with respect to the second polarizing film 18, the linearly polarized light passed through the second polarizing film 18 falls so that polarization thereof is at a 45° clockwise angle with respect to a phase delay axis 9a of the retardation film 9 for circularly polarized light, and it is turned into a right-handed circularly polarized light.

Since the fourth embodiment employed the cholesteric liquid crystal polymer sheet 10 which is twisted right in the same manner as the first embodiment, light components in a scattering band width Δλ is reflected around a scattering center wavelength λc are reflected due to the selective scattering phenomenon.

Transmitted light other than light components in the scattering band width Δλ reaches the backlight 16 because the translucent light absorbing member 15 provided in the second embodiment is not provided in the fourth embodiment. An EL plate showing emitted light in a bluish green is employed as the backlight 16 in the same manner as the second embodiment. The EL plate is prepared by printing granular light emitting bodies on a base film, then covering the base film with a film forming a transparent electrode thereon. Accordingly, the light emitting surface of the EL plate has a function of scattering polarized light so that transmitted light other than the light components in the scattering band width Δλ and reached the backlight 16 is disturbed its polarized state by the granular light emitting bodies, and hence it is reflected.

In FIG. 7, the reflected light from the backlight 16 transmits through the cholesteric liquid crystal polymer sheet 10, then transmits through the retardation film 9 for circularly polarized light again and reaches the second polarizing film 18. However, a state of polarization is disturbed by the backlight 16, the light can not be returned to a complete linearly polarized light by the retardation film 9 for circularly polarized light, and hence the reflected light from the backlight 16 is almost absorbed by the second polarizing film 18. Accordingly, it is possible to obtain a reflected gold color in a bright metallic tone even if the translucent light absorbing member 15 is omitted.

When a voltage is applied between first transparent electrodes 3 of the STN liquid crystal cell 12 and second transparent electrodes 4 thereof, the molecules in the nematic liquid crystals 6 are caused to rise up, and birefringency of the STN liquid crystal cell 12 undergoes a change, so that polarization direction of the linearly polarized outgoing light is rotated by about 90° so as to be in the direction at +75° with respect to the horizontal axis H. Accordingly, since the polarization direction of the linearly polarized light transmitted through the STN liquid crystal cell 12 is deviated by 90° from the transmission axis 18a of the second polarizing film 18, so that all components of light falling on the second polarizing film 18 are absorbed thereby, indicating black display.

Since the liquid crystal display device employs the EL plate having a luminescence center wavelength of λL=510 nm, and showing emitted light in a bluish green color as the backlight 16 in the same manner as the first embodiment, the light can not be transmitted in a black display state where no voltage is applied, while light in wavelength of not more than 560 nm can be transmitted in a state where golden reflected color is displayed when no voltage is applied, so that a brightness relation is indicated in the same way as the display by external light, and hence an excellent visibility can be obtained.

Since the translucent light absorbing member is not provided in the liquid crystal display device of the fourth embodiment compared with the second embodiment, the amount of transmitted light increases when the backlight is lit up to increase display brightness, so that bright illumination can be obtained.

As mentioned above, with the construction comprising the liquid crystal display device comprising the first polarizing film 17, the retardation film 13, the STN liquid crystal cell 12, the second polarizing film 18, the retardation film 9 for circularly polarized light, the cholesteric liquid crystal polymer sheet 10 and the backlight 16, it is possible to obtain a liquid crystal display device capable of indicating bright reflected color with high contrast, and indicating the same display in brightness relation between illumination by backlighting and the display by an external light, and indicating a single color display in high metallic tone to enhance high visibility even at night.

Modification of Fourth Embodiment

Although the STN liquid crystal cell 12 and the retardation film 13 are employed in the fourth embodiment, the function of scattering polarized light on the light emitting surface of the backlight 16 may be utilized while removing the translucent light absorbing member 15 in the same manner as the liquid crystal display device of the fourth embodiment even in the liquid crystal display device employing the TN liquid crystal cell 7 used in the first embodiment, or in the liquid crystal display device employing the STN liquid crystal cell 14 and the twisted phase difference plate 19 used in the third embodiment. Even in such cases, a bright display can be obtained when the backlight is lit up, compared with the liquid crystal display devices in the first and third embodiment.

Further, although the EL plate showing emitted light in a bluish green color is used as the backlight 16 in the fourth embodiment, it is possible to use a side light provided with a light emitting diode showing emitted light in a green color which is attached to a plastic light guide plate. In this case, an effective function of scattering polarized light can be obtained by providing irregularities on the surface of the plastic light guide plate, a reflector having a rough surface at the lower portion of the plastic light guide, or the like.

Figure 8:
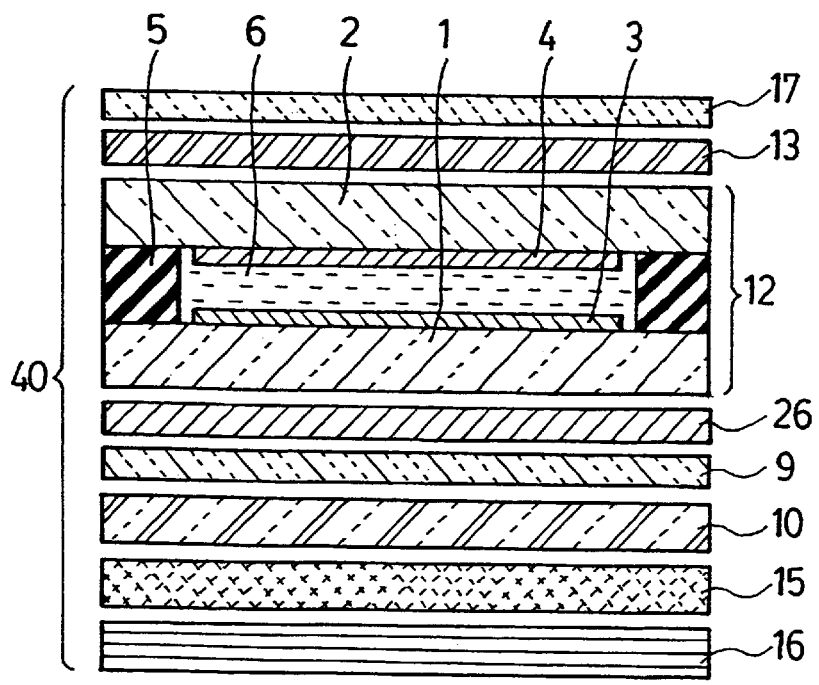
FIG. 8 is a schematic sectional view showing a constitution of a liquid crystal display device according to a fifth embodiment of the invention.

Fifth Embodiment: FIG. 8

A liquid crystal display device according to a fifth embodiment of the invention is now described with reference to FIG. 8.

Since the liquid crystal display device of this embodiment is the same as the second embodiment in construction as explained with reference to FIGS. 3 and 4 except that the second polarizing film is a reflection-type polarizing film, the different point alone is described hereinafter with reference to FIG. 8.

A liquid crystal display device 40 in the fourth embodiment comprises an STN liquid crystal cell 12 with about 225° twisted nematic liquid crystal sealed therein, a retardation film 13, and a first polarizing film 17 disposed successively on a visible side (upper side in FIG. 8), and a reflective polarizing film 26, a retardation film 9 for circularly polarized light, a cholesteric liquid crystal polymer sheet 10, translucent light absorbing member 15 and a backlight 16 disposed successively on a side opposite from the visible side (lower side in FIG. 8).

The reflection-type polarizing film 26 is first described. The first polarizing film 17 and the second polarizing film 18 which have been employed in the first to fourth embodiments are formed of normal polarizing films, namely, absorption-type polarizing films which absorb linearly polarized light having polarizing direction which intersects a transmission axis at right angle, and indicates a black display. On the other hand, the reflection-type polarizing film reflects linearly polarized light having polarizing direction which intersects a transmission axis at right angle, and indicates a silver display. In the fifth embodiment, a product called as D-BEF manufactured by Sumitomo 3M corporation is used as a reflection-type polarizing film.

The operation for displaying colors by the liquid crystal display device 40 in the fifth embodiment is described next. In a state where no voltage is applied to the STN liquid crystal cell 12 in the liquid crystal display device 40, a linearly polarized light which falls on the retardation film 13 from the visible side through the first polarizing film 17 is turned in a state of an elliptic polarized light when it passes through the retardation film 13. The elliptic polarized light is corrected during passage through the STN liquid crystal cell 12, is turned into substantially linearly polarized light, and outgoes having a polarization direction rotated counterclockwise by about 55° with respect to the transmission axis 17a of the first polarizing film 17 shown in FIG. 4.

Since the transmission axis of the reflection-type polarizing film 26 is the same of the transmission axis 18a of the second polarizing film 18 in the second embodiment and is disposed so that it is oriented in the direction of 15° on the basis of a horizontal axis H. Accordingly, the linearly polarized light which falls on from the first polarizing film 17 passes through the reflection-type polarizing film 26 as it is.

Since a phase delay axis 9a of the retardation film 9 for circularly polarized light is disposed at an angle of +45° relative to a transmission axis of the reflection-type polarizing film 26, the linearly polarized light which passed through the reflection-type polarizing film 26 falls at a 45° clockwise angle with respect to a phase delay axis 9a of the retardation film 9 for circularly polarized light and it is turned into right-handed circularly polarized light.

Since the fifth embodiment employed the cholesteric liquid crystal polymer sheet 10 which is twisted right in the same manner as the first embodiment, light components in a scattering band width Δλ is reflected around a scattering center wavelength λc are reflected due to the selective scattering phenomenon, and light transmitted through wavelength regions other than the scattering bandwidth Δλ, is absorbed by the translucent light absorbing member 15, whereupon a golden reflected color in a bright metallic tone can be obtained.

When a voltage is applied between first transparent electrodes 3 of the STN liquid crystal cell 12 and second transparent electrodes 4 thereof, the molecules in the nematic liquid crystals 6 are caused to rise up, and birefringency of the STN liquid crystal cell 12 undergoes a change, so that polarization of the linearly polarized light outgoing is rotated by about 90° so as to be in the direction at +75° with respect to the horizontal axis H. Accordingly, since polarization direction of the linearly polarized light transmitted through the STN liquid crystal cell 12 is deviated by 90° from the transmission axis of the second polarizing film 26, so that almost all components of light falling on the second polarizing film 26 are reflected thereby, indicating silver display.

Since the liquid crystal display device employs the EL plate having a luminescence center wavelength of $\lambda L=510$ nm, and showing emitted light in a bluish green color as the backlight 16 in the same manner as the first embodiment, the light can not be transmitted in a silver display state where a voltage is applied, while light in a wavelength of not more than 560 nm can be transmitted in a state where a golden reflected color is displayed when no voltage is applied, and further the same display in brightness relation between the display therein and the display by an external light without lighting up the backlight can be obtained, to enhance high visibility even at night.

As mentioned above, with the construction comprising the liquid crystal display device comprising the first polarizing film 17, the retardation film 13, the STN liquid crystal cell 12, the reflection-type polarizing film 26, the retardation film 9 for circularly polarized light, the cholesteric liquid crystal polymer sheet 10, the translucent light absorbing member 15 and the backlight 16, it is possible to obtain a liquid crystal display device capable of indicating silver characters against background in gold with bright reflected color, which becomes a correct conversion display in the same manner as the display by an external light even illumination by backlighting, and of indicating a single colored display in a metallic tone with high visibility even at night.

Modification of Fifth Embodiment

Although the STN liquid crystal cell 12 and the retardation film 13 are employed in the fifth embodiment, if a reflection-type polarizing film 26 is employed in place of a second polarizing film 18 even in the liquid crystal display device employing the TN liquid crystal cell 7 in the first embodiment, and the liquid crystal display device employing the STN liquid crystal cell 14 and twisted retardation film 19 in the third embodiment, the same liquid crystal display device as the fifth embodiment can be obtained.

Further, although the liquid crystal display device displays a silver character against a background in gold in this embodiment, it is possible to display a golden character against a background in silver by twisting a transmission axis 17a of a first polarizing film 17 by 90°. Further, it is also possible to obtain a liquid crystal display device capable of displaying a variety of colors such as blue characters in a metallic tone against a background in silver, green character in a metallic tone against a background in silver by changing twist pitch of a cholesteric liquid crystal polymer sheet 10.

Still further, although a translucent light absorbing member 15 was provided between the backlight 16 and the cholesteric liquid crystal polymer sheet 10 in this embodiment, even if function of scattering polarized light of the light emitting surface of the backlight 16 is utilized while removing the translucent light absorbing member 15 as mentioned in the fourth embodiment, the same liquid crystal display device as the fourth embodiment can be obtained.

Figure 9:
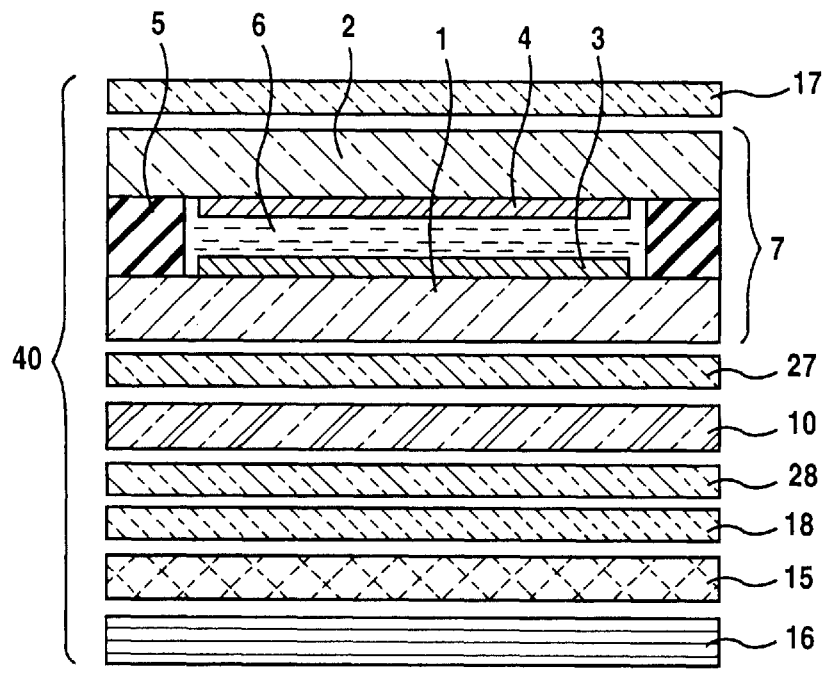
FIG. 9 is a schematic sectional view showing a constitution of a liquid crystal display device according to a sixth embodiment of the invention.
Figure 10:
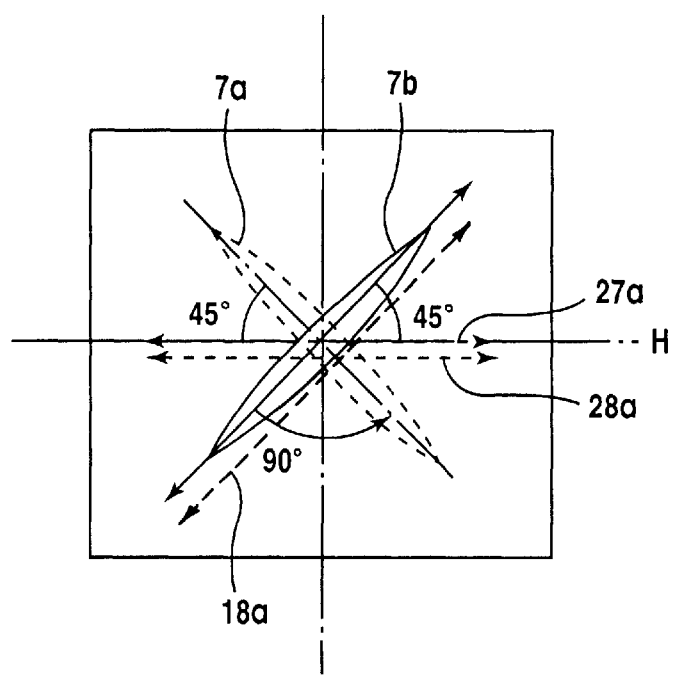
FIG. 10 is a schematic illustration showing relative positions of respective components of the liquid crystal display device according to the sixth embodiment of the invention.

Sixth Embodiment: FIG. 9, FIG. 10

A liquid crystal display device according to a sixth embodiment of the invention is now described with reference to FIG. 9 and FIG. 10.

Since the liquid crystal display device of this embodiment is the same as the first embodiment in construction except that two pieces retardation films for circularly polarized light are employed and the position of a second polarizing film 18 is different, the different points alone are described hereinafter.

The liquid crystal display device 40 comprises, as shown in FIG. 9, a first polarizing film 17, a TN liquid crystal cell 7, a cholesteric liquid crystal polymer sheet 10, a second polarizing film 18, a translucent light absorbing member 15 and a backlight 16 disposed successively on the visible side (upper side in FIG. 9), which are the same as the first embodiment.

A first retardation film 27 for circularly polarized light disposed between the TN liquid crystal cell 7 and the cholesteric liquid crystal polymer sheet 10, and a second retardation film 28 for circularly polarized light 28 disposed between the cholesteric liquid crystal polymer sheet 10 and the second polarizing film 18 are respectively called as a quarter-wavelength plate which is the same as the retardation film 9 for circularly polarized light (FIG. 1) as employed in the first embodiment, and which is prepared by spreading a polycarbonate resin to a thickness of about 60 $\mu$m, and the phase difference value is 140 nm.

A first substrate 1, the first retardation film 27 for circularly polarized light, the cholesteric liquid crystal polymer sheet 10, the second retardation film 28 for circularly polarized light and the second polarizing film 18 are respectively bonded using an acrylic adhesive (not shown). Further, the first polarizing film 17 and a second substrate 2 are also bonded to each other using an acrylic adhesive (not shown).

Shown in FIG. 10, the transmission axis 17a of the first polarizing film 17 points 45° upward to the right in the same manner as alignment direction 7b of the upper liquid crystal molecules of the TN liquid crystal cell 7, and a transmission axis 18a of the second polarizing film 18 points 45° upward to the right in the same manner as an alignment direction 7b of the upper liquid crystal molecules of the TN liquid crystal cell 7, while a phase delay axis 27a of the first retardation film 27 for circularly polarized light and a phase delay axis 28a of the second retardation film 28 for circularly polarized light are respectively disposed horizontally.

The operation for displaying colors by the liquid crystal display device 40 of the sixth embodiment is described next.

In a state where no voltage is applied to the TN liquid crystal cell 7 in the liquid crystal display device 40, a linearly polarized light which is changed to the direction of the transmission axis 17a and which falls thereon from a visible side through the first polarizing film 17 is polarized in the direction same as alignment direction 7b of the upper liquid crystal molecules of the TN liquid crystal cell 7 and falls thereon, and is rotated by 90° by the TN liquid crystal cell 7 and it outgoes after it is turned into a linearly polarized light in the alignment direction 7a of the lower liquid crystal molecules.

The linearly polarized light outgoing from the TN liquid crystal cell 7 falls on the phase delay axis 27a of the first retardation film 27 for circularly polarized light as a 45° right-handed linearly polarized light. Accordingly, as shown in the OFF-state in FIG. 13, the light falls thereon is turned into a right-handed circularly polarized light, and it is rotated clockwise same as the twisting direction 10a of the cholesteric liquid crystal polymer sheet 10, so that light components in a scattering band width Δλ is reflected around a scattering center wavelength λc are reflected due to the selective scattering phenomenon. Further, transmitted light in wavelength regions other than the scattering bandwidth Δλ transmits through the second retardation film 28 for circularly polarized light, but it is absorbed by the translucent light absorbing member 15, whereupon a golden reflected color in a bright metallic tone is obtained.

If the voltage is applied between first transparent electrodes 3 and second transparent electrodes 4, molecules of a nematic liquid crystals nematic liquid crystals 6 are caused to rise up to extinguish the light rotation property so that linearly polarized light falling thereon from the alignment direction 7b of the upper liquid crystal molecules transmits through the TN liquid crystal cell 7 in the same direction as it is. Accordingly, the linearly polarized light transmitted through the TN liquid crystal cell 7 falls on the first retardation film 27 for circularly polarized light at a 45° counterclockwise angle, so that it is turned into a left-handed circularly polarized light shown in the ON-state in FIG. 13. Further, the linearly polarized light is opposite to the twisting direction 10a of the cholesteric liquid crystal polymer sheet 10, so that light having all the wavelengths transmits through the cholesteric liquid crystal polymer sheet 10.

Light which transmitted through the cholesteric liquid crystal polymer sheet 10 is returned to linearly polarized light at the second retardation film 28 for circularly polarized light but the oscillation direction thereof is rotated by 90° from the direction in which light falls on the first retardation film 27 for circularly polarized light, and becomes the same direction as an alignment direction 7a of the lower liquid crystal molecules. Since the transmission axis 18a of the second polarizing film 18 is disposed at +45° which is the same as the alignment direction 7b of the upper liquid crystal molecules, light transmitted through the second retardation film 28 for circularly polarized light is absorbed by the second polarizing film 18 to indicate a black display.

An EL plate having a luminescence center wavelength λL of 510 nm, and showing emitted light in a bluish green color is employed as a backlight 16 in the same manner as the first embodiment. When the backlight 16 is lit up in a black display state where a voltage is applied, light transmitted through the second polarizing film 18 is rotated by 90° by the second retardation film 28 for circularly polarized light and the first retardation film 27 for circularly polarized light, and it is absorbed by the first polarizing film 17, and hence it does not transmit through light of the backlight 16.

In an OFF-state displaying golden reflected color when no voltage is applied, light in a wavelength of not more than 560 nm can transmit so that it is well illuminated, and the same display in brightness relation between the display therein and the display by an external light without lighting up by the backlight 16 (correct conversion display) to enhance a good visibility even at night.

Accordingly, with the construction comprising the first polarizing film 17, the TN liquid crystal cell 7, the first retardation film 27 for circularly polarized light, the cholesteric liquid crystal polymer sheet 10, the second retardation film 28 for circularly polarized light, the second polarizing film 18, the translucent light absorbing member 15 and the backlight 16, it is possible to obtain a liquid crystal display device capable of indicating bright reflected color display with high contrast, and indicating the same display in brightness relation between illumination by backlighting and the display by an external light, and indicating a single colored display in a metallic tone with high visibility even at night.

Modification of the Sixth Embodiment

Although the TN liquid crystal cell 7 is employed in the sixth embodiment, even if the first retardation film 27 for circularly polarized light, the cholesteric liquid crystal polymer sheet 10, the second retardation film 28 for circularly polarized light and the second polarizing film 18 are employed in the liquid crystal display device employing the STN liquid crystal cell 12 and the retardation film 13 used in the second embodiment, or in the liquid crystal display device employing an STN liquid crystal cell 20, the twisted retardation film 19 used in the third embodiment, the liquid crystal display device which is the same as the sixth embodiment can be obtained.

Further, in this modification, although the translucent light absorbing member 15 is disposed between the backlight 16 and the second polarizing film 18, the liquid crystal display device similar to the sixth embodiment obtained even if the translucent light absorbing member 15 is removed as explained in the fourth embodiment.

Still further, although a normal absorption-type polarizing film is employed as the second polarizing film 18, a reflection-type polarizing film can be employed as explained in the polarizing film 18, a reflection-type polarizing film can be employed as explained in the fifth embodiment.

Figure 12:
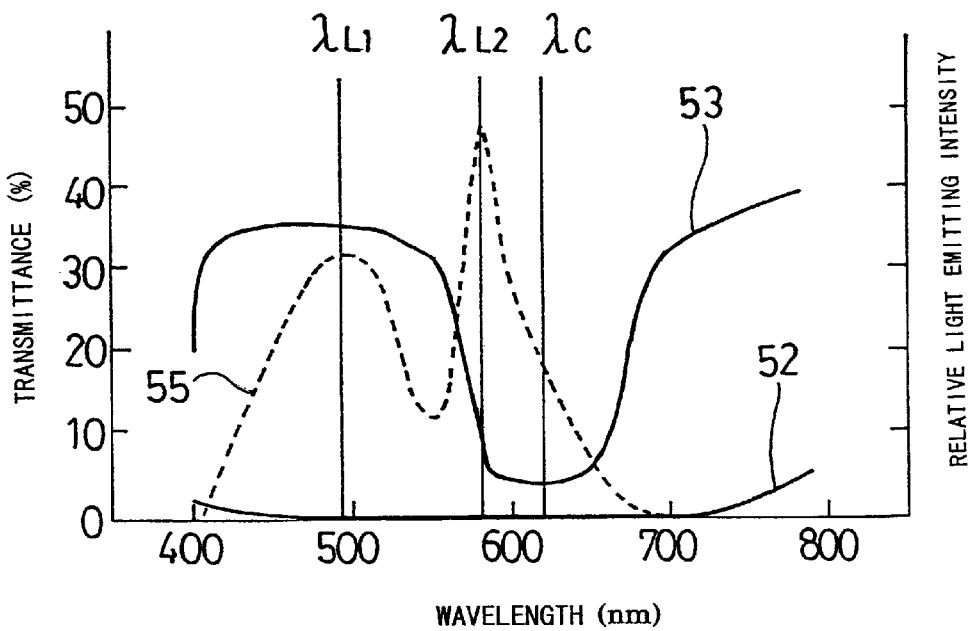
FIG. 12 is a diagrammatic view showing transmittance and emission spectrum of a backlight, of a liquid crystal display device according to a seventh embodiment of the invention.

Seventh Embodiment: FIG. 12

A liquid crystal display device according to a seventh embodiment of the invention is now described with reference to FIG. 12.

Since the liquid crystal display device of the seventh embodiment is the same as the second embodiment in construction as explained in FIG. 3 except that an EL plate showing emitted light in a while color is employed as a backlight, the explanation of the construction thereof using the sectional view is omitted.

The EL plate showing emitted light in a while color is prepared by coating fluorescent dye having light emitting wavelength of 580 nm on the surface of the EL plate showing emitted light in a bluish green color employed in the second embodiment. A light emitting spectrum of the EL plate showing emitted light in a while color and transmittance curve of the liquid crystal display device are shown in FIG. 12.

The light emitting operation and the operation when the backlight is lit up in the seventh embodiment of the invention are now described with reference to FIG. 12.

In FIG. 12, the transmittance of the liquid crystal display device in a state where no voltage is applied to the liquid crystal display device in the seventh embodiment at the selective scattering state is shown by a solid curve 53, whereas the transmittance of the same in a state where no voltage is applied to the liquid crystal display device at the black display state is shown by a solid curve 52. In a state where no voltage is applied, it is found from the curve 53 that right-handed circularly polarized light in the range from 560 nm to 670 nm around the scattering center wavelength of λc=610 nm is reflected, but light components in wavelength regions other than the scattering bandwidth transmit as they are.

Accordingly, if the transmitted light is absorbed by the translucent light absorbing member 15 or the returning of light to the visible side is restrained by the function of scattering polarized light on the light emitting surface of the backlight 16, it is possible to indicate a bright golden display by the reflected light due to the selective scattering phenomenon.

On the other hand, in a state where a voltage is applied, it is found from the curve 52 that light transmitted through the first polarizing film 17 is almost absorbed by the second polarizing film 18 to indicate a black display.

The operation of the backlight 16 is described next. Since the EL plate showing emitted light in a while color is prepared by printing fluorescent dye having luminescence center wavelength of 580 nm on the surface of the EL plate showing emitted light in a bluish green color, it has two luminescence center wavelengths. A curve 55 denoted by broken line in FIG. 12 shows a relative light emitting spectrum of the EL plate showing emitted light in a while color used in the seventh embodiment. The EL plate showing emitted light in a while color has two light luminescence peaks, i.e., a first luminescence center wavelength $\lambda L1=490$ nm and a second luminescence center wavelength $\lambda L2=580$ nm, and it shows whitish light emitting color.

Although the liquid crystal display device indicates a golden reflected color display in a state where no voltage is applied, light having a wavelength of not more than 560 nm can transmit through the cholesteric liquid crystal polymer sheet 10. Accordingly, light having the first light luminescence peak, and light having the wavelength which is shorter than the second luminescence center wavelength $\lambda L2$ of the second light luminescence peak respectively transmit through the cholesteric liquid crystal polymer sheet 10 and can brightly illuminate so that a high visibility can be obtained even at night.

By the employment of not less than two luminescence center wavelengths as the backlight 16 as described above, it is possible to indicate a bright reflected color display with high contrast and to indicate the same display in brightness relation between the display therein and the display by an external light without illumination by backlighting, thus indicating a single colored display in a metallic tone with a high visibility even at night.

Modification of Seventh Embodiment

Although the STN liquid crystal cell 12 and the retardation film 13 are employed in the seventh embodiment, if the EL plate showing emitted light in a while color having a plurality of luminescence center wavelengths as the back light 16 is employed even in the liquid crystal display device employing the TN liquid crystal cell 7 used in the first embodiment, or in the liquid crystal display device employing the STN liquid crystal cell 20 and the twisted retardation film 19 used in the third embodiment, the liquid crystal display device which is the same as the seventh embodiment can be obtained.

Although the EL plate showing emitted light in a while color is prepared by coating florescent dye having light emitting wavelength 580 nm on the surface of an EL plate showing emitted light in a bluish green color in the seventh embodiment, it is possible to employ the EL plate showing emitted light in a while color prepared by printing florescent dye on the lower side of a transparent electrode on the surface of the EL plate showing emitted light in a bluish green color or by mixing florescent dye into bluish green light emitting body.

Further, although an EL plate having two luminescence center wavelengths, namely, the luminescence center wavelengths $\lambda L1=490$ nm and $\lambda L2=580$ nm has been used as the backlight 16 in the seventh embodiment, if at least one light emitting wavelength is deviated from the selective scattering center wavelength $\lambda c$ of the cholesteric liquid crystal polymer sheet 10 by not less than 50 nm, bright display can be obtained when the EL plate is lit up.

Still further, although an EL film showing emitted light in a white color is used as the backlight 16 in the seventh embodiment, even if a side light provided with two kinds of, i.e., green and red light emitting diodes in light emitting color which are attached to a plastic light guide plate, or a side light provided with white florescent light in light emitting color which is attached to a plastic light guide plate is used in this embodiment, the same bright illumination can be obtained.

Still further, although the translucent light absorbing member 15 is provided between the backlight 16 and the cholesteric liquid crystal polymer sheet 10 in the seventh embodiment, it is needless to say that the same liquid crystal display device as the seventh embodiment can be obtained even if the translucent light absorbing member 15 is removed as explained in the fourth embodiment.

Industrial Applicability

As is evident from the above explanation, it is possible to obtain the liquid crystal display device capable of indicating a single reflected color display in a bright metallic tone, and capable of displaying a single color which can be visible even at dark environment such as night by lighting up the backlight.

Further, if the liquid crystal display device does not employ a translucent light absorbing member, it is possible to indicate a single color display in a bright metallic tone to obtain more bright reflected color, and also capable of increasing brightness when the backlight is lit up.

Accordingly, the liquid crystal display device according to the invention can be expected to be utilized in a broad area as display devices, of the variety of watches, portable electronic devices, game devices, or the like.

What is claimed is:

1. A liquid crystal display device comprising:
    a TN liquid crystal cell with about 90° twisted nematic liquid crystals sealed in-between a pair of transparent substrates having respective transparent electrodes;
    a first polarizing film disposed on a visible side of the TN liquid crystal cell; and
    a second polarizing film, a retardation film for circularly polarized light, a cholestric liquid crystal polymer sheet, a translucent light absorbing member and a backlight disposed successively on a side of the TN liquid crystal cell, opposite from the visible side thereof.

2. A liquid crystal display device comprising:
    an STN liquid crystal cell with 180° to 270° twisted nematic liquid crystals sandwiched between a pair of transparent substrates having respective transparent electrodes;
    a retardation film disposed on a visible side of the STN liquid crystal cell;
    a first polarizing film disposed on an outer side of the retardation film; and
    a second polarizing film, a retardation film for circularly polarized light, a cholestric liquid crystal polymer sheet, a translucent light absorbing member and a backlight disposed successively on a side of the STN liquid crystal cell, opposite from the visible side thereof.

3. A liquid crystal display device according to claim 2, wherein the retardation film is a twisted retardation film.

4. A liquid cell display device comprising:
a TN liquid crystal cell with about 90° twisted nematic liquid crystals sealed in-between a pair of transparent substrates having respective electrodes;
a first polarizing film disposed on a visible side of the TN liquid crystal cell; and
a second polarizing film, a retardation film for circularly polarized light, a cholesteric liquid crystal polymer sheet and a backlight disposed successively on a side of the TN liquid crystal cell, opposite from the visible side thereof,
wherein a face of said backlight, opposite to said cholesteric liquid crystal polymer sheet, has a function of scattering polarized light.

5. A liquid crystal display device comprising:
an STN liquid crystal cell with 180° to 270° twisted nematic liquid crystals sandwiched between a pair of transparent substrates having respective transparent electrodes;
a retardation film disposed on a visible side of the STN liquid crystal cell;
a first polarizing film disposed on an outer side of the retardation film; and
a second polarizing film, a retardation film for circularly polarized light, a cholesteric liquid crystal polymer sheet and a backlight disposed successively on a side of the STN liquid crystal cell, opposite from the visible side thereof,
wherein a face of said backlight, opposite to said cholesteric liquid crystal polymer sheet, has a function of scattering polarized light.

6. A liquid crystal display device according to claim 5, wherein the retardation film is a twisted retardation film.

7. A liquid crystal display device comprising:
a TN liquid crystal cell with about 90° twisted nematic liquid crystals sealed in-between a pair of transparent substrates having respective transparent electrodes;
a first polarizing film disposed on a visible side of the TN liquid crystal cell; and
a first retardation film for circularly polarized light, a cholesteric liquid crystal polymer sheet, a second retardation film for circularly polarized light, a second polarizing film, a translucent light absorbing member and a backlight disposed successively on a side of the TN liquid crystal cell, opposite from the visible side thereof.

8. A liquid crystal display device comprising:
an STN liquid crystal cell with 180° to 270° twisted nematic liquid crystals sandwiched between a pair of transparent substrates having respective transparent electrodes;
a retardation film disposed on a visible side of the STN liquid crystal cell;
a first polarizing film disposed on an outer side of the retardation film; and
a first retardation film for circularly polarized light, a cholesteric liquid crystal polymer sheet, a second retardation film for circularly polarized light, a second polarizing film, a translucent light absorbing member and a backlight disposed successively on a side of the STN liquid crystal cell, opposite from the visible side thereof.

9. A liquid crystal display device according to claim 8, wherein the retardation film is a twisted retardation film.

10. A liquid crystal display comprising:
a TN liquid crystal cell with about 90° twisted nematic liquid crystals sealed in-between a pair of transparent substrates having respective transparent electrodes;
a first polarizing film disposed on a visible side of the TN liquid crystal cell; and
a first retardation film for circularly polarized light, a cholesteric liquid crystal polymer sheet, a second retardation film for circularly polarized light, a second polarizing film and a backlight disposed successively on a side of the TN liquid crystal cell, opposite from the visible side thereof,
wherein a face of said backlight, opposite to said second polarizing film, has a function of scattering polarized light.

11. A liquid crystal display device comprising:
an STN liquid crystal cell with 180° and 270° twisted nematic liquid crystals sandwiched between a pair of transparent substrates having respective transparent electrodes;
a retardation film disposed on a visible side of the STN liquid crystal cell;
a first polarizing film disposed on an outer side of the retardation film; and
a first retardation film for circularly polarized light, a cholesteric liquid crystal polymer sheet, a second retardation film for circularly polarized light, a second polarizing film and a backlight disposed successively on a side of the STN liquid crystal cell, opposite from the visible side thereof,
wherein a face of said backlight, opposite to said second polarizing film, has a function of scattering polarized light.

12. A liquid crystal display device according to claim 11, wherein the retardation film is a twisted retardation film.

13. A liquid crystal display device according to claim 1, wherein a luminescence center wavelength of the backlight is deviated by not less than 50 nm from a selected scattering center wavelength of the cholesteric liquid crystal polymer sheet.

14. A liquid crystal display device according to claim 4, wherein a luminescence center wavelength of the backlight is deviated by not less than 50 nm from a selected scattering center wavelength of the cholesteric liquid crystal polymer sheet.

15. A liquid crystal display device according to claim 7, wherein a luminescence center wavelength of the backlight is deviated by not less than 50 nm from a selected scattering center wavelength of the cholesteric liquid crystal polymer sheet.

16. A liquid crystal display device according to claim 10, wherein a luminescence center wavelength of the backlight is deviated by not less than 50 nm from a selected scattering center wavelength of the cholesteric liquid crystal polymer sheet.

17. A liquid crystal display device according to claim 1, wherein the backlight has not less than two luminescence center wavelengths, and at least one of the luminescence center wavelengths is deviated by not less than 50 nm from a selected scattering center wavelength of the cholesteric liquid crystal polymer sheet.

18. A liquid crystal display device according to claim 4, wherein the backlight has not less than two luminescence center wavelengths, and at least one of the luminescence center wavelengths is deviated by not less than 50 nm from a selected scattering center wavelength of the cholestric liquid crystal polymer sheet.

19. A liquid crystal display device according to claim 7, wherein the backlight has not less than two luminescence center wavelengths, and at least one of the luminescence center wavelengths is deviated by not less than 50 nm from a selected scattering center wavelength of the cholestric liquid crystal polymer sheet.

20. A liquid crystal display device according to claim 10, wherein the backlight has not less than two luminescence center wavelengths, and at least one of the luminescence center wavelengths is deviated by not less than 50 nm from a selected scattering center wavelength of the cholestric liquid crystal polymer sheet.

21. A liquid crystal display device according to claim 1, wherein the second polarizing film is a reflection-type polarizing film.

22. A liquid crystal display device according to claim 4, wherein the second polarizing film is a reflection-type polarizing film.

23. A liquid crystal display device according to claim 7, wherein the second polarizing film is a reflection-type polarizing film.

24. A liquid crystal display device according to claim 10, wherein the second polarizing film is a reflection-type polarizing film.

* * * * *

UNITED STATES PATENT AND TRADEMARK OFFICE
CERTIFICATE OF CORRECTION

PATENT NO. : 6,297,864 B1 Page 1 of 1
DATED : October 2, 2001
INVENTOR(S) : Kaneko et al.

It is certified that error appears in the above-identified patent and that said Letters Patent is hereby corrected as shown below:

Title page,
Item [54], change "LIQUID CRYSTAL DISPLAY" to be -- LIQUID CRYSTAL DISPLAY DEVICE --
Item [22], change "Feb. 9, 200" to -- Mar. 3. 1999 --

Column 25,
Line 7, change "A liquid cell display" to be -- a liquid crystal display --

Column 26,
Line 7, change "A liquid crystal display comprising" to be -- A liquid crystal display device comprising --

Signed and Sealed this

Twenty-ninth Day of October, 2002

Attest:

JAMES E. ROGAN
Attesting Officer   Director of the United States Patent and Trademark Office